United States Patent [19]

Otake et al.

[11] Patent Number: 5,587,723

[45] Date of Patent: Dec. 24, 1996

[54] DISPLAY RANGE CONTROL APPARATUS AND EXTERNAL STORAGE UNIT FOR USE THEREWITH

[75] Inventors: Masahiro Otake, Kyoto; Toyofumi Takahashi, Tokyo; Satoshi Nishiumi, Kyoto; Takashi Otsuki, Tokyo, all of Japan

[73] Assignees: Nintendo Co., Ltd., Kyoto; Ricoh Co., Ltd., Tokyo, both of Japan

[21] Appl. No.: 226,891

[22] Filed: Apr. 13, 1994

Related U.S. Application Data

[63] Continuation of Ser. No. 792,196, Nov. 13, 1991, abandoned.

[30] Foreign Application Priority Data

Nov. 17, 1990 [JP] Japan .................................. 2-312410

[51] Int. Cl.[6] .................................................. G09G 1/16
[52] U.S. Cl. .......................... 345/118; 345/114; 345/191; 348/596; 395/134
[58] Field of Search .................................. 345/113, 114, 345/118, 121, 191; 395/130, 133, 134, 135, 152, 158; 348/584, 585, 586, 594, 595, 596, 598, 600

[56] References Cited

U.S. PATENT DOCUMENTS

| | | | |
|---|---|---|---|
| 4,116,444 | 9/1978 | Mayer et al. | 340/734 |
| 4,354,184 | 10/1982 | Woborschil | 340/731 |
| 4,641,255 | 2/1987 | Hohmann | 340/734 |
| 4,642,621 | 2/1987 | Nemoto et al. | 340/723 |
| 4,675,725 | 6/1987 | Parkyn | 358/22 |
| 4,675,737 | 6/1987 | Fujino et al. | 358/146 |
| 4,682,297 | 7/1987 | Iwami | 358/183 |
| 4,727,363 | 2/1988 | Ishii | 340/724 |
| 4,951,229 | 8/1990 | DiNicola et al. | 340/725 |
| 5,001,469 | 3/1991 | Pappas et al. | 340/798 |
| 5,185,858 | 2/1993 | Emery et al. | 395/158 |
| 5,195,177 | 3/1993 | Kamiyama et al. | 395/134 |
| 5,255,360 | 10/1993 | Peaslee et al. | 395/130 |
| 5,274,364 | 12/1993 | Li et al. | 345/118 |
| 5,313,227 | 5/1994 | Aoki et al. | 345/118 |

*Primary Examiner*—Steven Saras
*Attorney, Agent, or Firm*—Nixon & Vanderhye P.C.

[57] ABSTRACT

A display range control apparatus includes an external storage unit in which position data representative of two points in a horizontal direction on a screen of a raster scan monitor are stored in advance together with still picture pattern data and character data. A counter is incremented for each dot or pixel on the screen. In a range where each of the position data is coincident with a count value of the counter, a masking signal is obtained. The masking signal is used for gating picture data using a gate circuit. The picture data outputted from the gate circuit is converted into a video signal which is then applied to the monitor.

20 Claims, 10 Drawing Sheets

F I G. 3
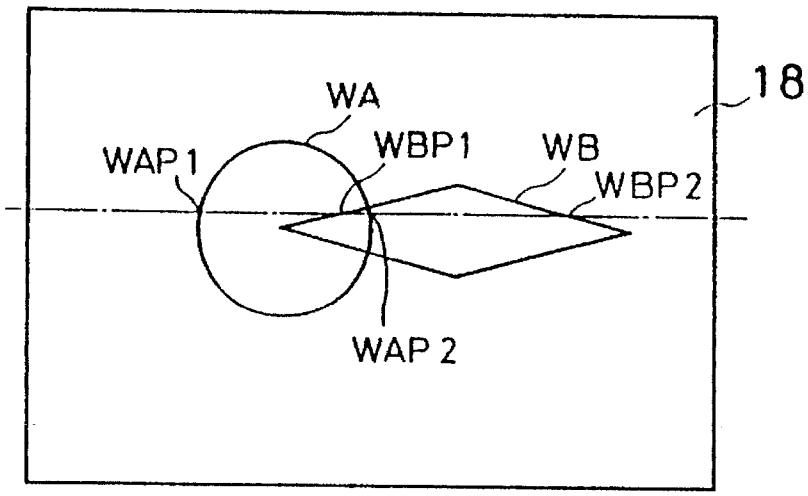
F I G. 5
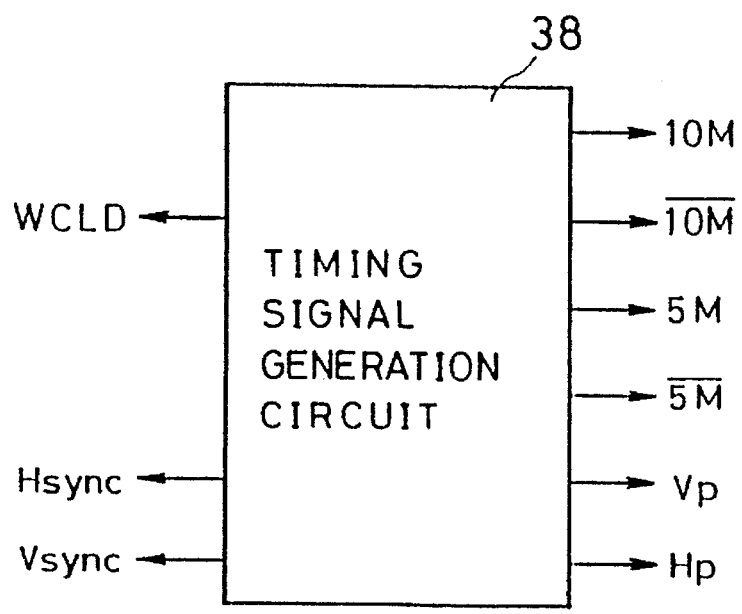

GATE 90

COMPOSITE DATA

MASK

WAEN = 1
WAIO = 1
WBEN = 0

WAEN = 1
WAIO = 0
WBEN = 0

WBEN = 1
WBIO = 1
WAEN = 0

WBEN = 1
WBIO = 0
WAEN = 0

WAEN = WBEN = 1
WLS1 = WLS2 = 0

WAEN = WBEN = 1
WLS1 = 0   WLS2 = 1

WAEN = WBEN = 1
WLS1 = WLS2 = 1

DISPLAY RANGE CONTROL APPARATUS AND EXTERNAL STORAGE UNIT FOR USE THEREWITH

This is a continuation of application Ser. No. 07/792,196, filed Nov. 13, 1991, now abandoned.

BACKGROUND OF THE INVENTION

1. Field of the Invention

The present invention relates to a display range control apparatus and an external storage unit for use therewith. More particularly, the present invention relates to a display range control apparatus along with an external storage unit for use in a TV game machine, for example, the display range control apparatus displaying a picture on a screen of a raster scan monitor while masking a range of that screen.

2. Description of the Prior Art

One type of TV game machine is disclosed in Japanese Patent Laid-Open No. 59-68184 (laid open on Jul. 7, 1984 (corresponding to U.S. Pat. No. 4,824,106 issued on Apr. 25, 1989). In such a type of TV game machine, it is conceivable that when texts are displayed throughout a text-based adventure game or when an outdoor scenery as it is viewed from an window of a building or a vehicle is displayed, a window on a screen of a raster scan monitor is formed so as to display a picture within that window alone the rest of the screen is masked.

According to the above prior art method, pictures having the described window effect can be displayed by causing a suitable program to update still picture or background picture pattern data contained in a screen RAM.

One disadvantage of the above prior art method is that the screen RAM must be updated over a plurality of frames because it is impossible to update the whole RAM instantaneously. Such frame-by-frame updating impairs visual effects. Furthermore, the above method has constraints on the window configuration. That is, while a rectangular window only requires the screen RAM to accommodate character codes for black or white characters, a circular window necessitates separately storing characters corresponding to diverse shapes of components making up the circle. To implement this feature would require the character memory to be increased in capacity. Since the TV game machine must be inexpensive so as to be competitive on the market, the machine cannot afford the memory capacity increase and is thus subject to window configuration constraints.

One way to circumvent the above problem is to transfer the character data to a separate RAM which is then updated to vary character shapes. One disadvantage of this solution is that it takes time to update the character RAM. The prolonged update makes the TV game machine impractical.

SUMMARY OF THE INVENTION

It is therefore an object of the present invention to provide a display range control apparatus free of constraints on the window configuration of the display screen.

It is another object of the present invention to provide a display range control apparatus capable of displaying the window instantaneously.

It is a further object of the invention to provide a display range control apparatus which eliminates the need to update still picture or background picture data.

It is an even further object of the invention to provide an external storage unit for use in display range control.

In carrying out the invention, there is provided a display range control apparatus displaying a picture on a screen of a raster scan monitor while masking a range of the screen, the control apparatus comprising: position data outputting means for generating position data representing two points in a horizontal direction on the screen of the raster scan monitor; picture data generating means for generating picture data; mask signal generating means for generating a mask signal in accordance with the position data during horizontal scanning of the raster scan monitor; gating means for gating the picture data in accordance with the mask signal; and video signal generating means for converting the picture data gated by the gating means into a video signal compatible with the raster scan monitor.

If an external storage unit is used for such a display range control apparatus, the above described position data are stored in the external storage unit and outputted therefrom.

The mask signal generating means compares each of two kinds of position data defining two points on the screen of the raster scan monitor with a count value of a counter incremented by a signal that corresponds to one dot (pixel) of the same screen. A high- or low-level mask signal is obtained within a range where the two kinds of position data match the count values. The gating means gates a video signal by AND'ing the mask signal and the picture data. The video signal generating means generates an RGB signal or a composite video signal in accordance with the picture data that passed through the gating means, and supplies a suitable display unit such as a raster scan monitor with the generated signal. Thus the screen of the raster scan monitor displays a picture either inside or outside the range defined by the two points.

According to the invention, the mask signal is produced simply by setting position data for defining two points in an external storage unit such as a memory cartridge, CD-ROM and etc. Such a simple construction still provides a sufficient window display feature. Because the mask signal is generated on the basis of the position data, it is easy to form a window whose shape is far more complex than that available with the prior art. Furthermore, the invention causes the window to appear instantaneously. Since the picture data is gated using the mask signal, there is no need to update the screen RAM or equivalent. This means that the burdens on the CPU are alleviated. These features are particularly suitable for incorporation into the TV game machine that must be inexpensive first and foremost.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3 is a view showing that a color window can be formed in the embodiment of FIG. 1;

FIG. 5 is an illustrative view showing a timing signal generation circuit in the embodiment of FIG. 1;

DETAILED DESCRIPTION OF THE PREFERRED EMBODIMENTS

Figure 1:
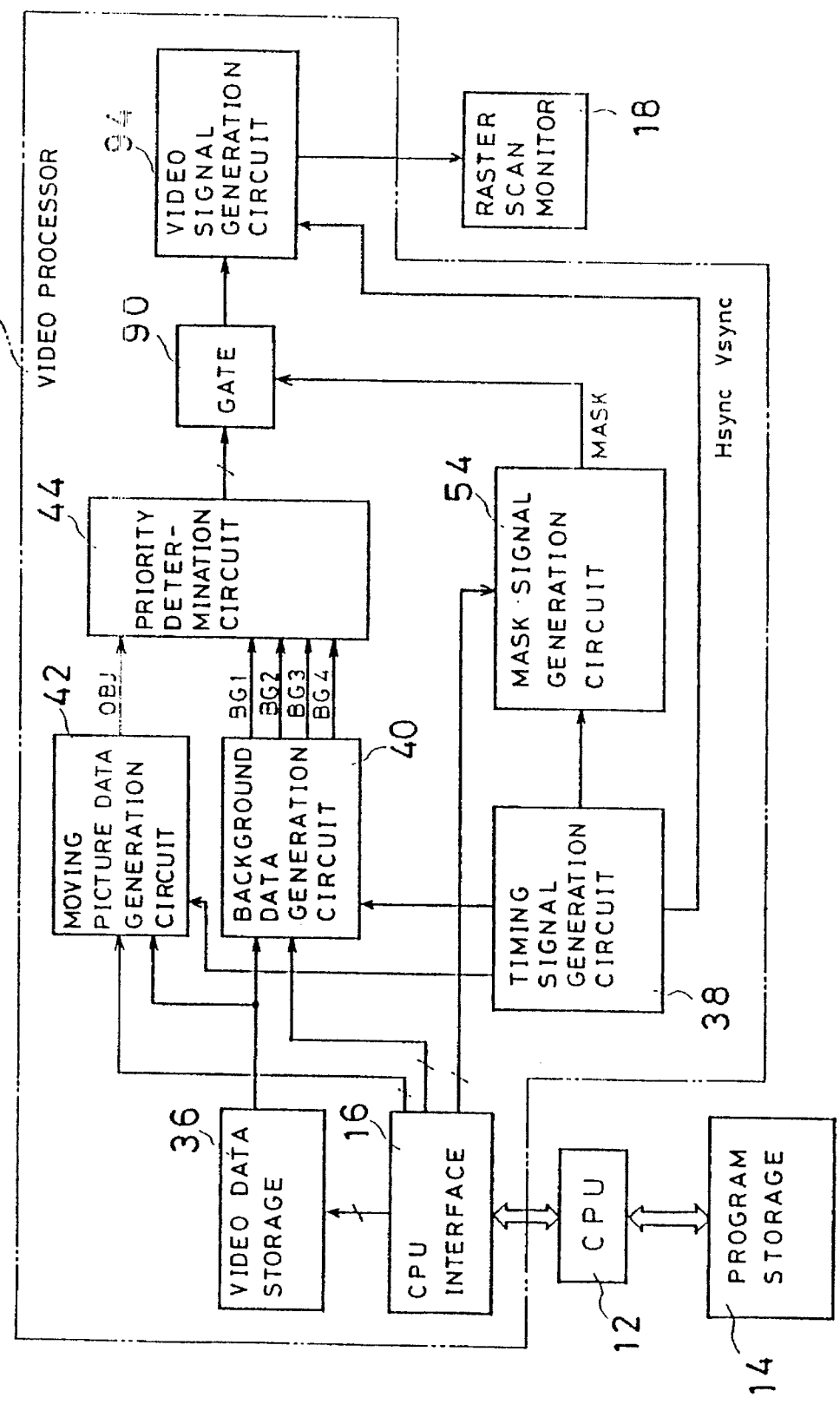
FIG. 1 is a block diagram showing one embodiment of the present invention.

Referring to FIG. 1, a video processor 10 is connected to a CPU 12. The CPU 12 supplies data to the components of the video processor 10 through a CPU interface 16 as per program data from a program storage 14 which is included in a detachable memory cartridge. The supplied data is needed to display a picture on a screen of a raster scan monitor 18 according to the program constituted by the program data. The CPU 12 may illustratively be a 16-bit microprocessor.

Figure 2:
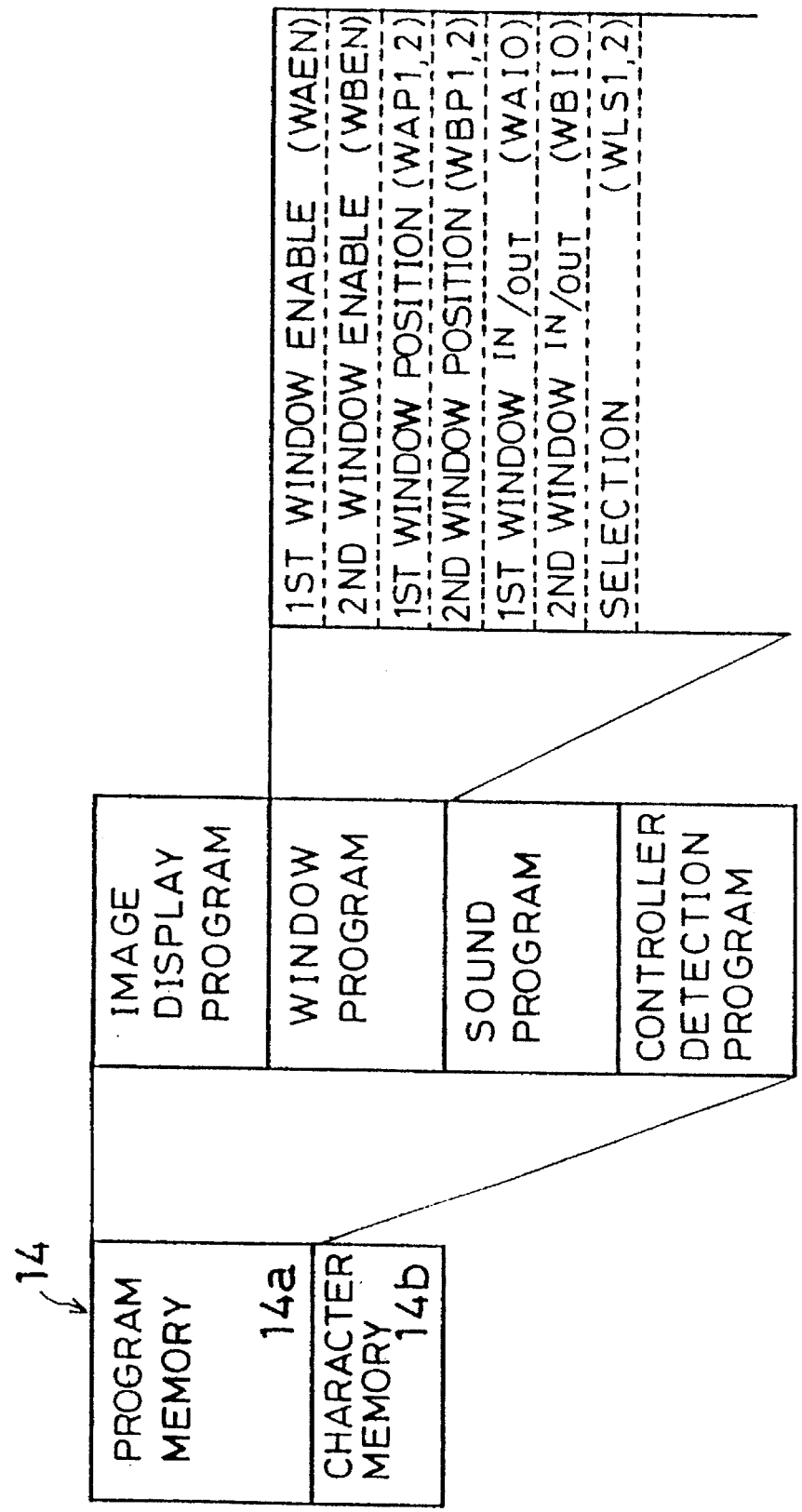
FIG. 2 is an illustrative view showing one example of program data stored beforehand in a program storage of the embodiment of FIG. 1.
Figure 16:
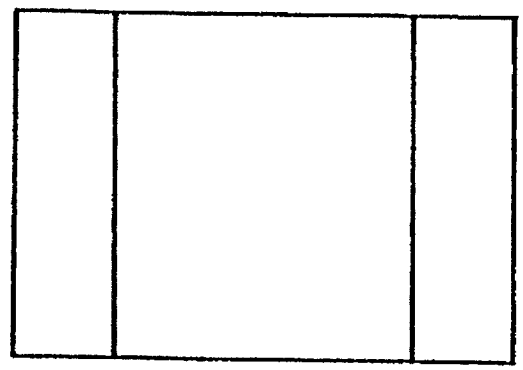
FIG. 16 is an illustrative view showing the case where window data are fixed.

The program storage 14 includes a memory containing the data making up a program needed to execute a game and the character data constituting characters of the moving pictures and background picture of that game. As shown in FIG. 2, the program data is stored in a program memory 14a typically made of a ROM, and the character data in a character memory 14b typically composed of RAM. The program memory 14a contains a window program in addition to the game execution program. The window program includes a first window enable signal WAEN, a second window enable signal WBEN, first window position data WAP1 and WAP2, second window position data WBP1 and WBP2, first window inside/outside designation data WAIO, second window inside/outside designation data WBIO, and selection data WLS1 and WLS2.

Where the first window position data WAP1 and WAP2 and the second window position data WBP1 and WBP2 are fixed, the resulting windows are displayed as depicted in FIG. 16, i.e., the windows appearing as curtains flanking a stage. When it changes the position data on each horizontal line of the CRT, the CPU 12 may set up such windows WA and WB as shown in FIG. 3. In this case, the picture may be masked inside or outside the window WA and/or the window WB. The first window position data WAP1 and WAP2 set per line designate the leftmost and rightmost positions of the first window WA; the second window position data WBP1 and WBP2 define the leftmost and rightmost positions of the second window WB. The first window inside/outside designation data WAIO and the second window inside/outside designation data WBIO are each one-bit data specifying either the inside or the outside of the first window WA and the second window WB, respectively. The first window WA and the second window WB are enabled by setting to "1" or (or to "0") the first window enable signal WAEN and the second window enable signal WBEN, respectively, both signal being one-bit data. The selection data WLS1 and WLS2 are utilized as a selection control signal for use with a multiplexer, to be described later.

The program data described above is read by the CPU 12 from the program storage 14 and is outputted thereby through the CPU interface 16. The CPU interface 16 includes an address decoder 22 and a data latch 22. The address decoder 22 receives address data over the address bus of the CPU 12, and the data latch 22 accepts data over the data bus of the CPU 12. The address decoder 20 decodes the address coming from the CPU 12 and outputs latch enable signals destined to the latches illustrated in FIG. 4. These latch enable signals are fed to the input terminals on one side of AND gates 24a through 24e constituting a gate circuit 24. The input terminals on the other side of the AND gates 24a through 24e are supplied with a write signal /WRITE which comes from the CPU 12 via an inverter. The inverted write signal /WRITE is also given to the data latch 22 as a latch signal.

When the CPU 12 outputs the first window leftmost position data WAP1 onto the data bus, the address designating the data latch 28 is placed onto the address bus. This causes the address decoder 20 to output a "1" to an AND gate 24b of the gate circuit 24. Thus the first window leftmost position data WAP1 latched by the data latch 22 is latched by the data latch 28. Likewise, the first window rightmost position data WAP2, the second window leftmost position data WBP1 and the second window rightmost position data WBP2 are latched respectively by data latches 30, 32 and 34 in response to the output from the address decoder 20, i.e., signals from the AND gates 24c, 24d and 24e.

Figure 4:
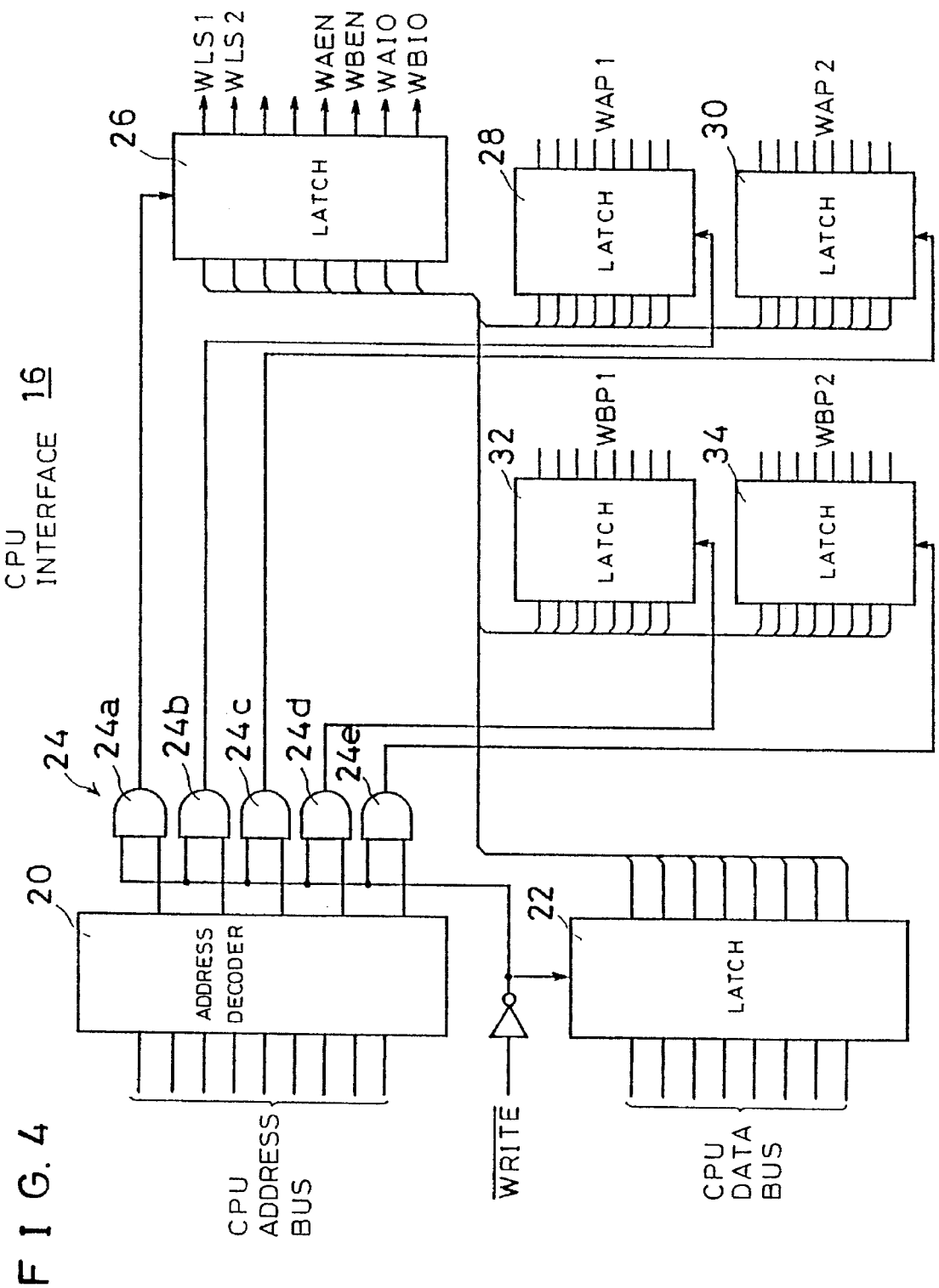
FIG. 4 is a block diagram showing a CPU interface in the embodiment of FIG. 1.

When a "1" is outputted to the AND gate 24a of the gate circuit 24, the data latch 26 latches the data or signals which the CPU 12 has read from the program storage 14, as shown in FIG. 4 and described earlier with reference thereto. The detailed description of the process will not be repeated here.

A picture data storage 36 is illustratively made of an SRAM (static random access memory) and includes a screen RAM and a character RAM. The graphic data (dot data) from the character memory 14b in the program storage 14 is transferred to the character RAM via the CPU 12 and the CPU interface 16.

The video processor 10 comprises a timing signal generation circuit 38. The circuit 38 receives a basic clock signal of, say, 21.47727 MHz and processes that signal illustratively using counter, decoder and logic circuit arrangements in order to generate necessary timing signals. These timing signals are supplied to the components contained in the video processor 10. For example, when the basic clock signal is divided by 2, a timing signal /10M (a slash "/"

means an inversion in this specification) is obtained. Dividing the timing signal /10M further by 2 generates a timing signal /5M that corresponds to a one-dot (pixel) display interval on the screen of the raster scan monitor 18. Thus, counting the timing signal /5M provides vertical position data Vp and horizontal position data Hp, the data Vp defining the vertical position on the screen of the monitor 18 and the data Hp designating the horizontal position thereon. In accordance with the vertical position data Vp and horizontal position data Hp, the timing signal generation circuit 38 generates synchronizing signals Vsync and Hsync that are needed by the raster scan monitor 18. The signals Vsync and Hsync are sent to a video signal generation circuit to be described later. Then the timing signal generation circuit 38 outputs a timing signal WCLD that is set to "1" at the start of each horizontal scan. The signal WCLD is given to a mask signal generation circuit to be discussed later.

Figure 6:
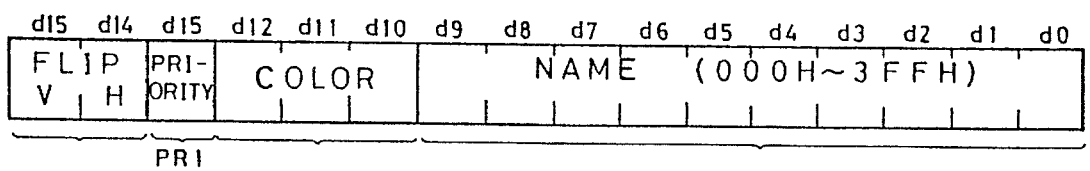
FIG. 6 is an illustrative view showing one example of background pattern data for use with the embodiment of FIG. 1.

The CPU 12 reads background pattern data and graphic data respectively from the program memory 14a and character memory 16b, and writes the respective data to a background pattern data area and a graphic data area in the picture data storage 36 via the CPU interface 16. A background data generation circuit 40 reads the pattern data (character code) on the background (still picture) from the background pattern data area in the picture data storage 36 and, based on the retrieved pattern data, reads the graphic data on the background from the picture data storage 36. The graphic data is then output as background data BG1, BG2, BG3 and BG4. That is, the background pattern data area in the picture data storage 36 receives and accommodates the background pattern data (shown in FIG. 6) on a character by character basis. The background pattern data representing one character comprises 10-bit name data (character code), three-bit attribute data, one-bit priority data and two-bit flip data. In accordance with the horizontal position data Hp and vertical position data Vp from the timing signal generation circuit 38, the background data generation circuit 40 calculates the address value of that background pattern area in the picture data storage 36 which corresponds to each line position on the screen of the raster scan monitor 18. The graphic data (dot data) making up the character which is represented by the name data is outputted from that area in the picture data storage 36 which is designated by the address value. Where a plurality of background cells are to be displayed, the above mentioned name data and priority data are read out as many times as the number of the cells. Then the dot data corresponding to each background cell is outputted along with the priority data. This embodiment allows a background of four cells to be output simultaneously. This is done by having the first, second, third and fourth background data BG1, BG2, BG3 and BG4 output from the background data generation circuit 40.

Figure 7:
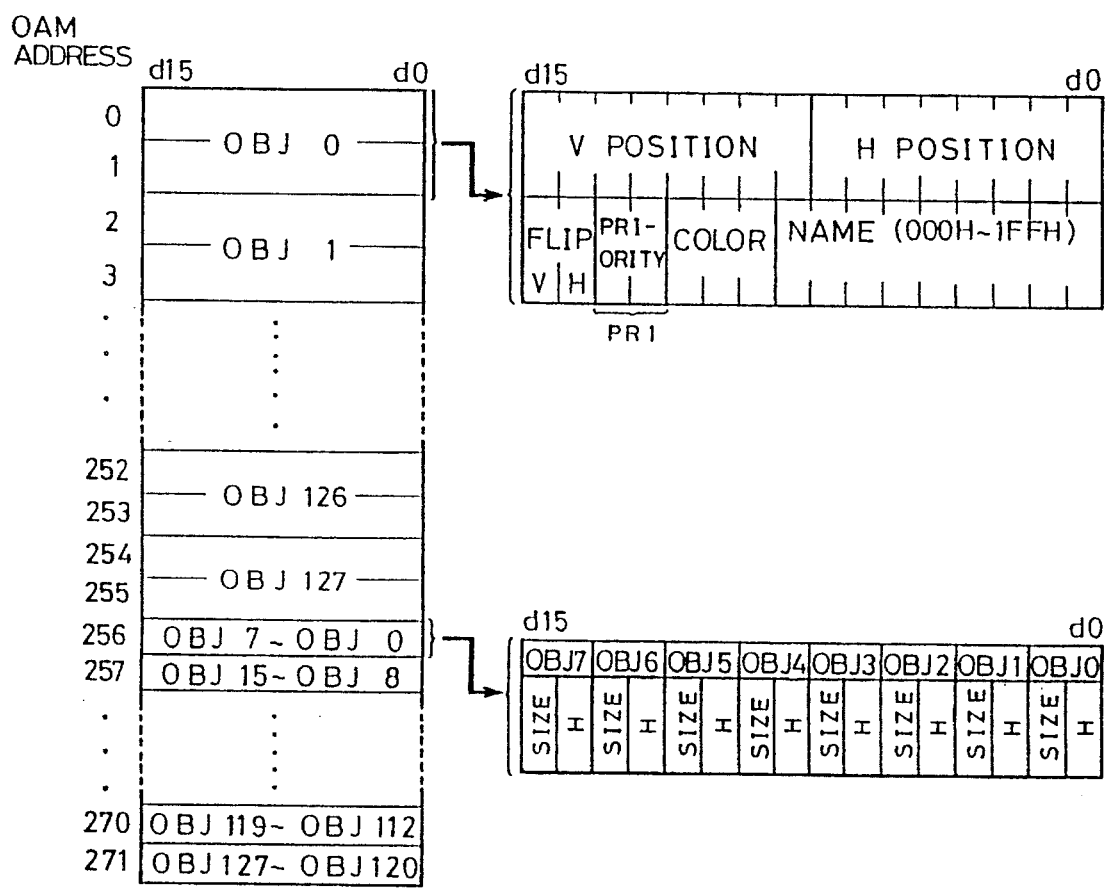
FIG. 7 is an illustrative view showing one example object data for use with the embodiment of FIG. 1.

An moving picture data generation circuit 42 contains an OAM (object attribute memory), not shown. The OAM stores a total of 78 object data (attribute data) items. As depicted in FIG. 7, an object data item is made of 34 bits, including nine-bit object designation data (name data), eight-bit vertical position data, nine-bit horizontal position data, three-bit color data, two-bit priority data, two-bit flip data and one-bit size selection data. A character data area in the picture data storage 36 is addressed in accordance with the vertical position data from the timing signal generation circuit 38 as well as with the name data and position data contained in the object data retrieved from the OAM. Thus the picture data storage 36 outputs the graphic data (dot data) and priority data about the designated character. In this manner, moving picture data OBJ is outputted from the moving picture data generation circuit 42.

Figure 8:
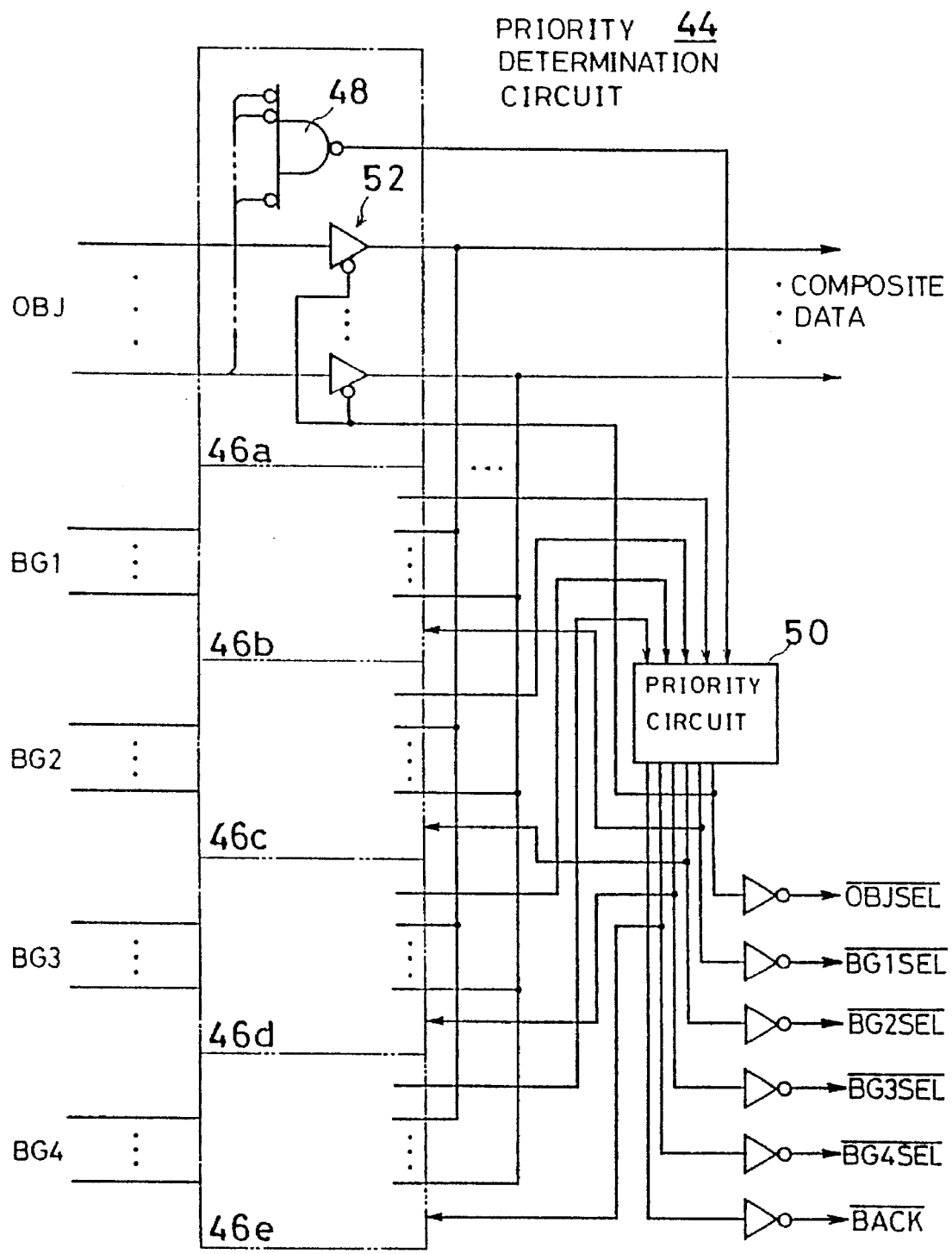
FIG. 8 is a block diagram showing a priority determination circuit in the embodiment of FIG. 1.
Figure 9:
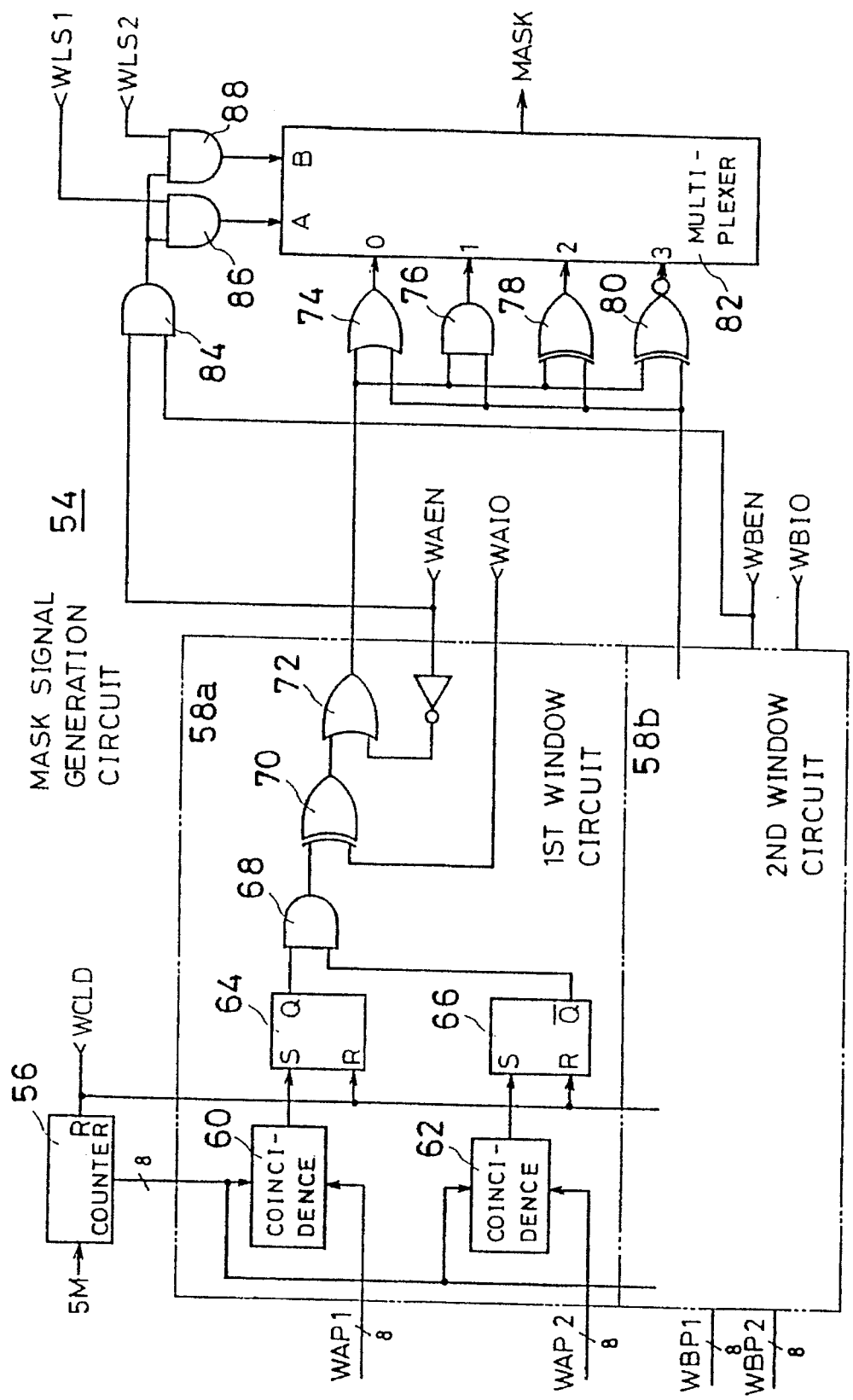
FIG. 9 is a block diagram showing a mask signal generation circuit in the embodiment of FIG. 1.

A priority determination circuit 44 is a circuit that permits preferential output of highly prioritized data indicated by the priority data, the prioritized data being among those about moving picture and background pictures overlapping with one another. Specifically, as shown in FIG. 8, the priority determination circuit 44 comprises transparency detection circuits 46a, 46b, 46c, 46d and 46e which correspond to the moving picture data OBJ and background data BG1, BG2, BG3 and BG4, respectively. Because these transparency detection circuits 46a–46e are of the same circuit construction, what follows is a description of the circuit 46a alone which is illustrated in FIG. 9. Description of the other transparency detection circuits 46b–46e will be omitted.

The transparency detection circuit 46a contains an OR gate 48. The inputs of the OR gate 48 are supplied with the bits of the moving picture data OBJ. In turn, the OR gate 48 outputs a transparency detection signal to a priority circuit 50. The transparency detection circuit 46a also contains a tri-state gate 52 that receives the bits of the moving picture data OBJ. It is defined with this embodiment that if all bits are "0", no moving picture is displayed, i.e., the moving picture picture is transparent. Thus the priority circuit 50 affords priority only to the data in effect when the output of the OR gate 48 in the transparency detection circuits 46a–46e is "1". The tri-state gate 52 outputs as composite picture data the moving picture data OBJ and background data BG1, BG2, BG3 and BG4 which are separately input to the priority determination circuit 44. That is, the priority circuit 50 detects the highest priority data from among the data in effect when the output of the transparency detection circuits 46a–46e is "1"; the circuit 50 then sets to "0" a composite picture data identification signal for the highest-priority data, thereby outputting the highest-priority picture data. For example, assume that the priority data for the moving picture data OBJ is set for the highest priority and that the OR gate 48 of the transparency detection circuit 46a outputs a "1". In this case, the priority circuit 50 outputs a composite picture data identification signal /OBJSEL that is "0" while the other composite picture data identification signals /BG1SEL, /BG2SE, /BG3SEL, /BG4SEL and /BACK are all output as "1". This causes the tri-state gate 52 in the transparency detection circuit 46a to open, allowing the priority determination circuit 44 to output only the moving picture data OBJ.

The composite picture data identification signal /BACK indicates that neither the moving picture data OBJ nor the background data BG1 through BG4 are outputted. In this case, a back color is displayed.

A mask signal generation circuit 54 will now be described. The circuit 54 is constructed to output a signal MASK that sets the color window range on the screen of the raster scan monitor 18. Specifically, as depicted in FIG. 9, the mask signal generation circuit 54 includes a counter 56 that receives as its clock input a timing signal 5M from the timing signal generation circuit 38. Thus the value on the counter 56 is updated for each bit on the screen of the raster scan monitor 18. The counter 56 is supplied as its reset input with the signal WCLD from the timing signal generation circuit 38. Given these signals, the counter 56 is reset every time horizontal scanning is started and is incremented by the clock signal 5M.

The output of the counter 56 (i.e., count value) is sent to a first window circuit 58a and a second window circuit 58b. In FIG. 9, only the first window circuit 58a is depicted in detail. Since the circuits 58a and 58b are of the same construction, the circuit 58a alone will now be described.

The first window circuit 58a includes two match detection circuits 60 and 62. The count value of the counter 56 is given to the inputs on the one side of the circuits 60 and 62. The inputs on the other side of the circuits 60 and 62 are fed with the first window leftmost and rightmost position data WAP1 and WAP2 from the data latches 28 and 30 in the CPU interface 16. The match detection circuit 60 compares the leftmost position data WAP1 with the count value from the counter 56. When the comparison results in a match, the match detection circuit 60 sends a set input to an RS-FF 64. Likewise, the match detection circuit 62 compares the rightmost position data WAP2 with the count value from the counter 56. Upon detecting a match, the circuit 62 sets an RS-FF 66. Because the RS-FF's 64 and 66 are reset like the counter 56 by the signal WCLD, each of them has its output Q set to "1" when supplied with a set input. It is to be noted that because the output of the RS-FF 66 is /Q, the RS-FF 66 outputs "0" when supplied with a set input.

The output Q of the RS-FF 64 and the inverted output Q of the RS-FF 66 are sent to an AND gate 68. In turn, the AND gate 68 outputs "1" at every horizontal scan for the time interval between the first window leftmost position data and the first window rightmost position data. The output of the AND gate 68 is supplied to an exclusive OR gate 70 together with the first window inside/outside designation signal WAIO from the CPU interface 16. When the signal WAIO is "1", the exclusive-OR gate 70 inverts the output from the AND gate 68 and forwards it to one of the two inputs of an OR gate 72. The other input of the OR gate 72 is supplied with the first window enable signal WAEN inverted by an inverter. Thus with the signal WAEN set to "1", the OR gate 72 outputs "1" while the output of the AND gate 68 is being "1".

Likewise, the second window circuit 58b provides OR gate outputs. These OR gate outputs are fed to the two inputs of an OR gate 74, an AND gate 76, an exclusive-OR gate 78 and an exclusive-NOR gate each. The outputs of the gates 74 through 80 are given to a multiplexer 82.

The signals WAEN and WBEN from the CPU interface 16 are supplied to an AND gate 84. The output of the AND gate 84 is sent to the inputs on the one side of AND gates 86 and 88. The inputs on the other side of the AND gates 86 and 88 are fed respectively with the control signals WLS1 and WLS2 from the CPU interface 16. The output from the AND gate 86 and that from the AND gate 88 are sent to the multiplexer 82 respectively as selection signals A and B.

The multiplexer 82 selects one of the four inputs from the gates 74 through 80 in accordance with the selection inputs A and B. The selected input is outputted as the mask signal MASK.

Figure 10:
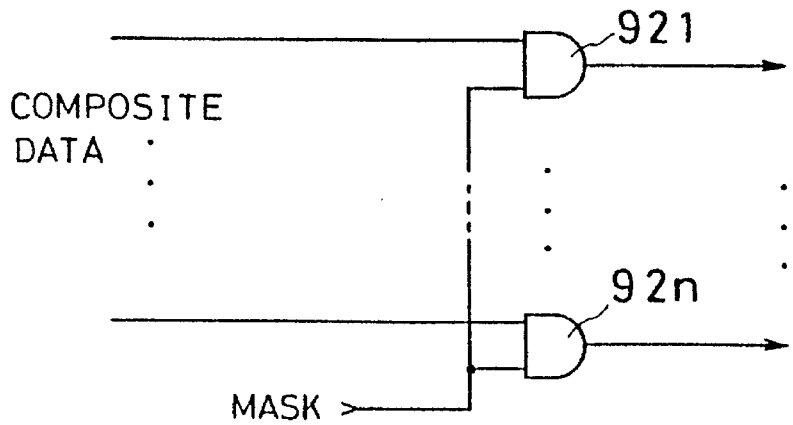
FIG. 10 is a block diagram showing a gate circuit in the embodiment of FIG. 1.

The n-bit composite data from the priority determination circuit 44 is input to a gate 90. As depicted in FIG. 10, the gate 90 comprises AND gates 92₁ through 92n which receive the composite data bits through the inputs on the one side thereof. The inputs on the other side of the AND gates 92₁–92n are supplied with the mask signal MASK from the mask signal generation circuit 54. Thus when the mask signal MASK is "1", the AND gates 92₁–92n send the bits of the composite picture data to a video signal generation circuit 94. In this manner, the composite picture data is gated by the gate 90.

The video signal generation circuit 94 is supplied with the synchronizing signals Hsync and Vsync from the timing signal generation circuit 38. Using processes known in the art, the video signal generation circuit 94 converts color tone data R, G and B from the gate 90 into an RGB signal or into a TV composite video signal containing the synchronizing signals. The resulting signal is fed to the raster scan monitor 18.

Figure 11A:
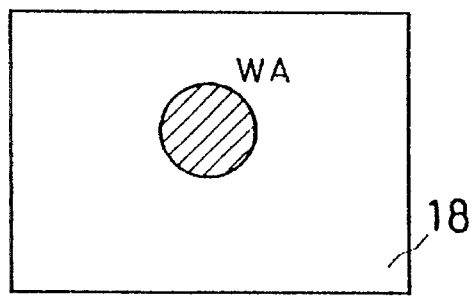
FIGS. 11A and 11B are illustrative views showing the case where only a first window is enabled, FIG. 11A depicting the inside of the window being enabled, FIG. 11B depicting the outside of the window being enabled.
Figure 11B:
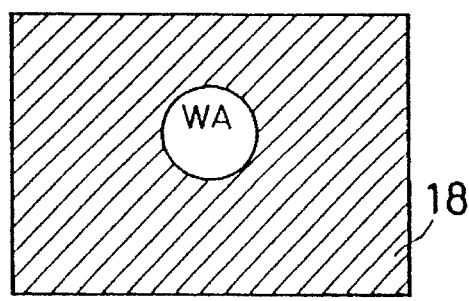
Figure 12A:
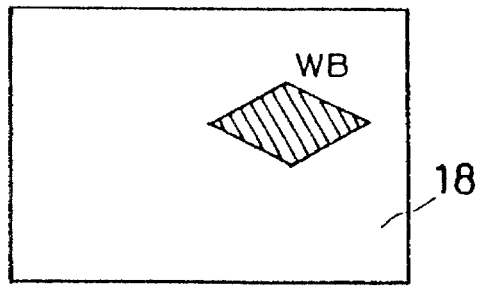
FIGS. 12A and 12B are illustrative views showing the case where only a second window is enabled, FIG. 12A depicting the inside of the window being enabled, FIG. 12B depicting the outside of the window being enabled.
Figure 12B:
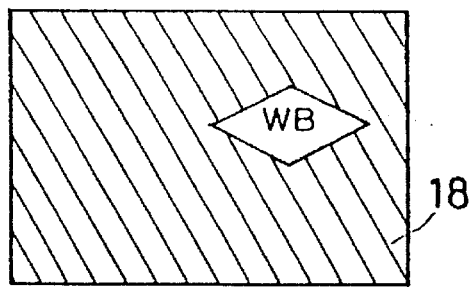

If the program in the program storage 14 stipulates that either the first window WA or the second window WB alone is to be used, the signal WAEN or WBEN from the CPU interface 16 is set to "1". At this point, the output of the AND gate 84 is set to "0". Thus the outputs of the AND gates 86 and 88 are both set to "0". This causes the multiplexer 82 to select the output of the OR gate 74 as the mask signal MASK. This means that when the first window WA alone is enabled, the mask signal MASK is set to "1" only in the hatched screen region of FIG. 11A or 11B. As a result, on the screen of the raster scan monitor 18, only the hatched region displays an animated picture or a still picture (background). FIG. 11A shows the case in which the inside/outside designation signal WAIO is set to "1", while FIG. 11B indicates the case where the signal WAIO is set to "0".

Where the second window WB alone is enabled, the mask signal MASK is set to "1" only in the hatched screen region of FIG. 12A or 12B. As a result, on the screen of the raster scan monitor 18, only the hatched region displays the picture. FIG. 12A shows the case in which the inside/outside designation signal WBIO is set to "1", while FIG. 12B indicates the case where the signal WBIO is set to "0".

Figure 13:
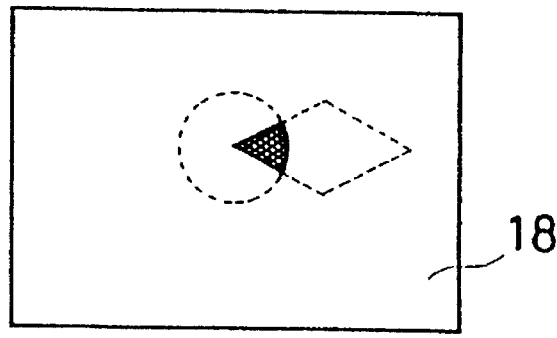
FIG. 13 is an illustrative view showing the case where the first and second windows are enabled in an AND'ed manner.
Figure 14:
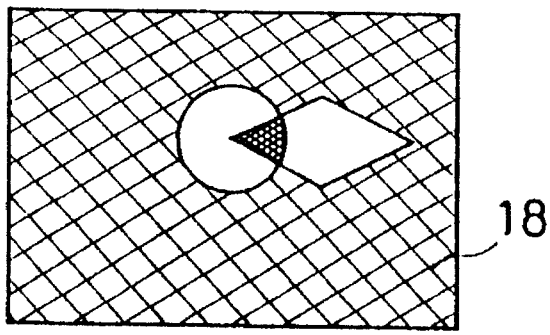
FIG. 14 is an illustrative view showing the case where the first and second windows are enabled in an exclusive-OR'ed manner.
Figure 15:
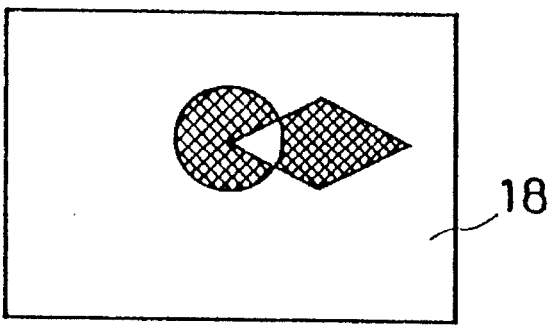
FIG. 15 is an illustrative view showing the case where the first and second windows are enabled in an exclusive-NOR'ed manner.

If the two enable signals WAEN and WBEN are both set to "1" in the program memory 14a of the program storage 14, the multiplexer 82 selects the output of the AND gate 76, exclusive-OR gate 78 or exclusive NOR gate 80 according to the selection control signals WLS1 and WLS2, and outputs the mask signal MASK, In this case, the two inside /outside designation signals WAIO and WBIO are both set to "1".

Where the selection control signals WLS1 and WLS2 are both set to "0", the multiplexer 82 selects the output of the AND gate 76. In this case, a mask signal MASK of "1" is outputted in the region hatched in FIG. 13. This allows the picture to appear only in that hatched region on the screen of the raster scan monitor 18.

Where the selection control signal WLS1 is set to "0" and the signal WLS2 set to "1", the multiplexer 82 selects the output of the exclusive-OR gate 78. In this case, a mask signal MASK of "1" is outputted in the region hatched in FIG. 14. This allows the picture to appear only in that hatched region on the screen of the raster scan monitor 18.

Where the selection control signals WLS1 and WLS2 are both set to "1", the multiplexer 82 selects the output of the exclusive-NOR gate 80. In this case, a mask signal MASK of "1" is outputted in the region hatched in FIG. 15. This allows the picture to appear only in that hatched region on the screen of the raster scan monitor 18.

In addition, a memory cartridge incorporating a semiconductor memory is used as an external storage unit in the above described embodiments; however, it is possible to use an external storage unit such as a CD-ROM in the present invention. In the case of use of the memory cartridge, the program data including the character data of the moving picture characters and the still picture characters and the aforementioned window program data are stored in the semiconductor memory, and the CPU 12 generates control data for the moving picture characters and the still (background) picture characters on the basis of the program data read from the semiconductor memory and outputs the same to the components of the video processor 10.

In contrast, in a case of use of the CD-ROM, the above described program data and the window program data are optically recorded as digital data in the CD-ROM (not shown). In addition, an optical reader for optically reading recorded data on the CD-ROM is connected to a suitable connector such as an expansion connector. Even if the CD-ROM is used as the external storage unit, a memory cartridge is also used. In this case, the memory cartridge is comprised with a ROM (not shown) that stores a starting program for controlling an operation of the optical reader, a buffer RAM (not shown) for temporarily storing the data read from the CD-ROM, and etc. Then, prior to a start of a display operation, the CPU 12 applies control data to the optical reader on the basis of the starting program of the ROM to cause the optical reader read the recorded data of the CD-ROM. A portion of the character data read from the CD-ROM is transferred to the character RAM and the program data is transferred to the buffer RAM included in the memory cartridge. The CPU 12 controls the components of the video processor 10 on the basis of the program data stored in the buffer RAM. That is, after the data read from the CD-ROM by the optical reader has been transferred to the respective memories, the CPU 12 and the video processor 10 execute the display operation by accessing the respective memories as done in the previous embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display control apparatus for displaying a picture on a screen of a raster scan monitor while masking a portion of said screen, said control apparatus comprising:

a position data output device for generating position data representing two points in a horizontal direction on said screen;

means for changing the position data of the two points between two or more horizontal lines on said screen;

a picture data generator for generating picture data including means for generating moving object picture data and means for generating background picture data;

a priority circuit for receiving the moving object and background picture data and selectively transmitting the picture data having a higher priority when the moving object and background picture data overlap;

a mask signal generator for generating a mask signal in accordance with said position data during horizontal scanning of said raster scan monitor;

a logic gate connected to said priority circuit and said mask signal generator for gating said picture data received from said priority circuit in accordance with said mask signal; and a video signal generator for converting the picture data gated by said logic gate into a video signal compatible with said raster scan monitor, wherein said means for changing changes the shape of the masked screen portion by changing the position data of the two points between two or more horizontal lines on said screen.

2. A display control apparatus according to claim 1, further comprising:

means for outputting a designation signal for designating one of an inside and outside of a portion of the screen defined by said two points;

wherein said mask signal generating means generates, in accordance with said designation signal, a mask signal that masks the inside or the outside of said screen portion.

3. A display control apparatus according to claim 1, wherein said position data outputting means includes first position data generating means for generating first position data for defining two points on said screen, and second position data generating means generating second position data for defining another two points on said screen, said another two points defined by said second position data being different from said two points defined by said first position data;

said mask signal generating means including:
first mask signal generating means for generating a first mask signal in accordance with said first position data;
second mask signal generating means for generating a second mask signal in accordance with said second position data; and
logically operating means for logically operating on said first mask signal and said second mask signal.

4. A display control apparatus according to claim 3, wherein said logically operating means performs a plurality of logical operation functions, and further comprises:

selection signal outputting means for outputting a selection signal which selects one of the logical operations provided by said plurality of logical operation functions; and selecting means for activating one of said plurality of logical operation functions in response to said selection signal.

5. The display control apparatus according to claim 1, wherein said still background picture data includes plural background cells and said means for generating said background picture data generates said plural background cells simultaneously.

6. The display control apparatus according to claim 1, wherein said screen portion is circularly shaped.

7. The display control apparatus according to claim 1, wherein said screen portion is shaped as a parallelogram.

8. The display control apparatus according to claim further comprising:

plural, overlapping screen portions wherein said masking signal determines what areas of the overlapping screen portions are masked.

9. The display control apparatus according to claim 8, wherein an overlapping area of the plural screen portions is masked.

10. The display control apparatus according to claim 8, wherein a nonoverlapping interior area of the plural screen portions is masked.

11. The display control apparatus according to claim 8, wherein an area outside the screen portions is masked.

12. The display control apparatus according to claim 1, further comprising:

means for generating interior and exterior mask signals, wherein the exterior of the screen portion is masked when one of the interior and exterior mask signals is generated and the interior of the screen portion is masked when other of the interior and exterior mask signals.

13. The display control apparatus according to claim wherein said control apparatus is a TV game machine.

14. An external storage unit for use with a game display control apparatus displaying a picture on a screen of a raster scan monitor while masking a portion of said screen, said game display control apparatus having a picture data generator for generating picture data; a mask signal generator for generating a mask signal during horizontal scanning of said raster scan monitor; a logic gate for gating said picture data in accordance with said mask signal; a video signal generator for converting the picture data gated by said logic gate into a video signal compatible with said raster scan monitor, wherein said external storage unit includes a memory for storing position data defining two points in a horizontal direction on said screen of said raster scan monitor so as to cause said mask signal generator to generate said mask signal; and means for changing the position data of the two points between two or more horizontal lines on said screen;

wherein said means for changing changes the shape of the masked screen portion by changing the position data of the two points between two or more horizontal lines on said screen.

15. An external storage unit according to claim 14, wherein said storage means stores a designation signal for designating one of an inside and outside of the screen portion defined by said two points so as to cause said mask signal generating means to generate a mask signal corresponding to one of the inside and outside of said screen portion.

16. An external storage unit according to claim 14, wherein said storage means stores first position defining two points on said screen of said raster scan monitor and second position data defining another two points on said screen, said another two points being different from said two points defined by said first position data so as to cause said mask signal generating means to generate a first mask signal and a second mask signal.

17. An external storage unit according to claim 16, wherein said mask signal generating means performs logically operating means for logically operating on said first mask signal and said second mask signal using one of a plurality of logical operation functions; and said memory means stores a selection signal for selecting one of the logical operations provided by said plurality of logical operation functions.

18. A display range control apparatus for displaying a picture on a screen of a raster scan monitor while masking a portion of said screen, said control apparatus comprising:

a position data output device for generating position data representing two points in a horizontal direction on said screen;

means for changing the position data of the two points between two or more horizontal lines on said screen;

a picture data generator for generating picture data;

a mask signal generator for generating a mask signal in accordance with said position data during horizontal scanning of said raster scan monitor;

means for outputting a signal for designating one of an inside screen portion and an outside screen portion as defined by said two points, said mask signal generator generating, in accordance with said designating signal, said mask signal corresponding to one of the inside and outside screen portions;

a logic gate for gating said picture data using said mask signal; and a video signal generator for converting the picture data gated by said logic gate into a video signal compatible with said raster scan monitor, wherein said means for changing changes the shape of the masked screen portion by changing the position data of the two points between two or more horizontal lines on said screen.

19. A display range control apparatus for displaying a picture on a screen of a raster scan monitor while masking a range of said screen, said control apparatus comprising:

a position data generator for generating position data representative of first and second points on each horizontal line on said screen;

means for changing the position data of the two points between two or more horizontal lines on said screen;

a clock signal generator for generating a clock signal associated with a dot position on said screen;

a counter for counting a horizontal position count value on each horizontal line on said screen on the basis of said clock signal;

a mask signal generator for generating different mask signals for at least one horizontal line of said raster scan monitor, a first mask signal being generated when the first point equals a first count value until the second point equals a second count value larger than said first count value, and a second mask signal being generated from a beginning of the horizontal line until the first point equals the first count value and from the second point equalling the second count value to an end of the horizontal line;

a logic gate for gating said picture data with said mask signal;

a video signal generator for converting the picture data gated by said gating means into a video signal compatible with said raster scan monitor, wherein said means for changing changes the shape of the masked screen portion by changing the position data of the two points between two or more horizontal lines on said screen.

20. A display range control apparatus according to claim 19, wherein said position data generating means includes changing means for changing data such that said range call be changed for each horizontal line.

* * * * *